Jan. 14, 1969  R. N. HOFMEISTER  3,421,251
ANIMAL TRAP
Filed June 24, 1966
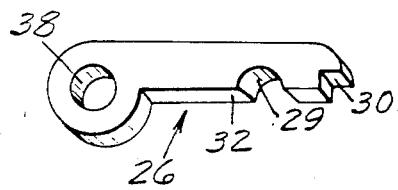
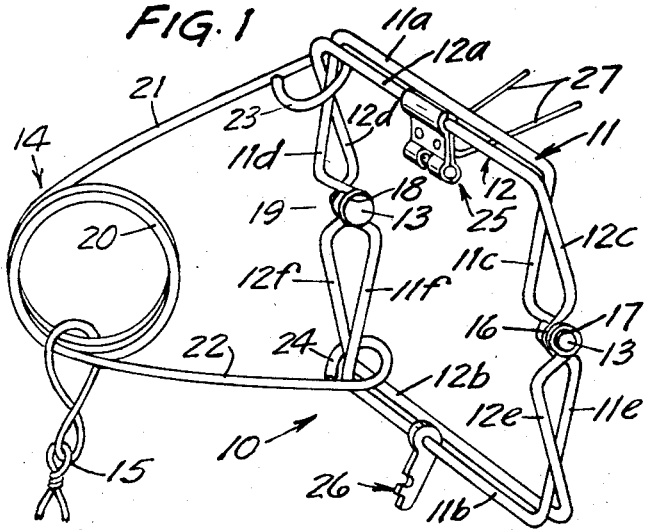
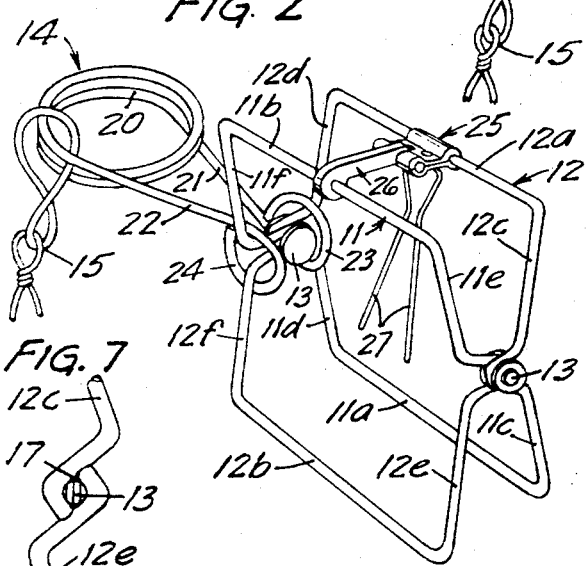
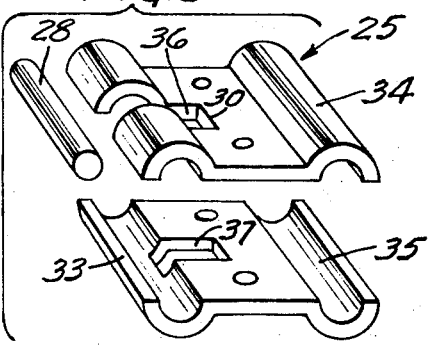
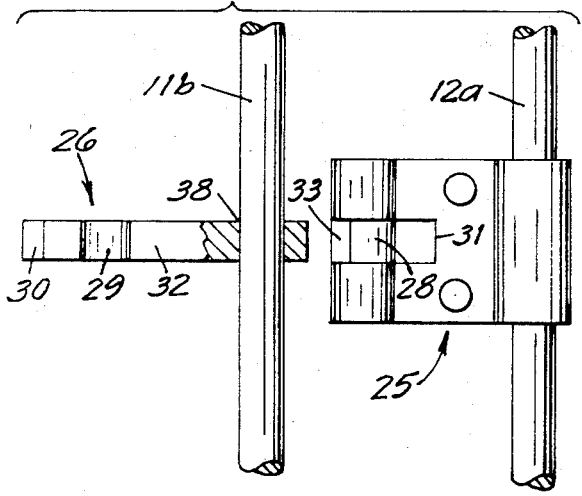
INVENTOR
RUSSELL N. HOFMEISTER
BY
Williamson, Palmatier & Bains
ATTORNEYS

United States Patent Office 3,421,251
Patented Jan. 14, 1969

1

3,421,251
ANIMAL TRAP
Russell N. Hofmeister, Waseca, Minn., assignor to Herter's Inc., Waseca, Minn., a corporation of Minnesota
Filed June 24, 1966, Ser. No. 560,279
U.S. Cl. 43—92                                     1 Claim
Int. Cl. A01m 23/28

ABSTRACT OF THE DISCLOSURE

The trap has spaced jaw members when in the set position. A latch is pivotally mounted on one jaw member and is provided with a detent in one edge and fulcrum surfaces on opposite sides of the detent. A trigger is pivotally mounted on the other jaw member and is provided with a transverse pin spaced from the pivot axis and has camming surfaces on opposite sides of the pin. In set position, the trigger pin engages the latch detent in the space between the jaws. A wire member is attached to the trigger for operation by an animal to release the jaws.

---

This invention relates to traps and more particularly relates to animal traps for trapping small, fur-bearing animals.

Since a trapper typically carries animal traps to predetermined locations along a trap line on foot, it is desirable that an animal trap be light and compact. It is particularly important, however, that the trap be extremely reliable. A trap which does not release at the slightest contact by an animal and engage the animal therein is relatively useless to a trapper. Of the traps presently on the market, the reliable and sensitive traps are typically relatively heavy and cumbersome. The light and compact traps presently available do not possess the required degree of sensitivity necessary for trapping small, fur-bearing animals.

With these comments in mind, it is to the elimination of these and other disadvantages to which the present invention is directed, along with the inclusion therein of other novel and desirable features.

An object of my invention is to provide a new and improved animal trap of simple and inexpensive construction and operation.

Another object of my invention is to provide a novel animal trap which releases upon the slightest contact by an animal with the trap.

Still another object of my invention is the provision of a novel animal trap which is of minimum weight and bulk without sacrificing the sensitivity necessary for efficient and profitable trapping.

A further object of my invention is the provision of a novel animal trap which is extremely simple in its assembly and which permits quick and easy setting by a person of minimum skill or manual dexterity.

These and other objects and advantages of my invention will more fully appear from the following description made in connection with the accompanying drawings wherein like reference characters refer to the same or similar parts throughout the several views, and in which:

FIG. 1 is a perspective view showing my animal trap in the relaxed condition.

FIG. 2 is a perspective view showing my animal trap in the set condition.

FIG. 3 is a partial plan view of the release mechanism of my trap with portions broken away for clarity and with the latch mechanism rotated away from the trigger device.

FIG. 4 is a partial side elevation of the release mechanism of my animal trap showing the latch engaged in the trigger device and with portions broken away for clarity.

FIG. 5 is a perspective view of the trigger device of my invention with the components shown in an exploded assembly view.

FIG. 6 is a perspective view showing the latch of my animal trap.

FIG. 7 is a partial view of the pivot receiving means of the depending portions of a jaw member.

One form of the present invention is shown in the drawings and is described herein. Referring to FIG. 1, my animal trap is indicated, in general, by numeral 10 and comprises a pair of jaw members or portions 11 and 12 which are pivoted at pivot 13 and which are adapted to be biased in the relaxed position shown by spring member 14. An anchor 15 is shown attached to spring member 14 and is adapted to be secured to a suitable stationary object such as a tree or a stake.

Jaw member 11 comprises an upper, transverse animal-engaging member 11a and a lower, transverse animal-engaging element 11b. Jaw member 12 comprises an upper, transverse animal-engaging element 12a and a lower, transverse animal-engaging element 12b. Transverse animal-engaging element 11a includes depending portions 11c and 11d and lower transverse portion 11b includes depending portions 11e and 11f. Similarly, upper transverse portion 12a includes depending portions 12c and 12d and the lower transverse portion 12b includes depending portions 12e and 12f. Jaws 11 and 12 are typically formed from a wire stock of suitable diameter bent to conform as desired. Depending portions 11c and 11e of jaw 11 are joined intermediate transverse members 11a and 11b to form a pivot point 16 adapted to receive suitable pivot means, indicated by numeral 13. Depending portions 12c and 12e are joined intermediate the transverse members 12a and 12b forming a rigid side member with means 17 adapted to receive a suitable pivot member 13 pivotally joining the depending side portions of jaw 11 and 12. Depending portions 11d and 11f are joined to provide a pivot point 18 and depending portions 12d and 12f are joined to provide a pivot point 19 adapted to receive pivot means 13.

Spring member 14 includes a coil 20 having suitable turns with depending arms 21 and 22. Spring arm 21 includes a loop portion 23 adapted to encircle depending portions 12d and 11d. Spring arm 22 includes a loop portion 24 adapted to encircle depending portions 11f and 12f. Coil 20 maintains arms 21 and 22 normally spaced apart a predetermined distance. Loop members 23 and 24 are consequently spread apart, and maintained in this spread apart position, thereby normally retaining jaw members 11 and 12 with animal-engaging elements 11a and 12a and elements 11b and 12b in side-by-side relation, respectively. A trigger device 25 is rotatably mounted on transverse animal-engaging element 12a and a mating latch element 26 is rotatably mounted on transverse element 11b. Trigger wires 27 are shown depending from trigger device 25.

Referring to FIG. 2, my animal trap is shown in set condition. Latch 26 is rotated on transverse member 11b into engagement with trigger device 25 which is rotatably mounted on transverse member 12a. In this position, transverse elements 11b and 12a are in spaced apart, parallel position and transverse elements 11a and 12b are in spaced apart, parallel relation. Spring 14, however, is compressed with arms 21 and 22 urging transverse elements 11a and 12a and 11b and 12b to return to the relaxed position indicated in FIG. 1. The latch and trigger mechanism, 26 and 25 respectively, maintains the trap in the set position. Engagement of trigger wire 27 releases latch 26 from trigger device 25 and allows spring 14 to return animal-engaging elements 11a and 12a and 11b and 12b to return to substantially mating relation thereby entrapping an animal contacting trigger wire 27.

In FIG. 3, trigger device 25 is shown mounted on animal-engaging transverse element 12a and the latch 26 is shown mounted on animal-engaging transverse element 11b. Latch 26 is rotated about element 11b for purposes of illustration. Trigger device 25 is rotatable about element 12a, and is shown in position to receive latch 26 when it is rotated into position. A portion of latch 26 is broken away at the point of rotatable attachment to transverse element 11b. As shown in FIG. 4, latch 26 is rotated into engagement with trigger device 25. Trigger device 25 includes a nonrotatable pin 28 adapted to receive the detent 29 in latch 26. Latch 26 includes a fulcrum surface 30 which engages a camming surface 31 on the trigger device 25. A secondary fulcrum surface 32 is shown on latch 26 which engages a mating camming surface 33 on trigger device 25. Trigger wires 27 are shown in FIG. 4 and are attached to trigger device 25 as by riveting, which rivets are indicated by numeral 33a.

Referring to FIG. 5, the trigger device 25 is shown in detail and includes an upper portion 34 and a lower portion 35, which portions are joined by rivets 33a as shown in FIG. 4. Nonrotatable pin 28 is shown and is retained in portions 34 and 35 by the compression exerted by the rivets on the upper and lower portions. As shown in FIG. 5, the camming surface 31 and secondary camming surface 33 operate to release the latch 26 from the trigger device 25 upon actuation of trigger wires 27. The trigger device 25 is suitably notched in the upper portion at 36 and in the lower portion at 37 to receive the latch 26 to properly orient the fulcrum surfaces on the latch with the camming surfaces on the trigger device.

Referring to FIG. 6, a perspective of the latch mechanism 26 is shown and includes an aperture 38 adapted to receive transverse element 11b for rotatable attachment thereto. Detent 29 which engages pin 28 on trigger device 25 is shown. Fulcrum surface 30 mates with camming surface 31 on the trigger device and secondary fulcrum surface 32 engages camming surface 33 on the trigger device.

FIG. 7 shows the formation of the pivot receiving joint of the depending portions 12c and 12e which form one of the side members of jaw 12. The pivot means is indicated at 13 and the pivot receiving opening at 17.

In operation, my animal trap is set by carefully gripping animal-engaging transverse elements 11b and 12a. These elements are drawn together thereby placing spring 14 in compression urging elements 11b and 12a apart. Arms 21 and 22 of the spring 14 operate to force the animal-engaging elements to return to the relaxed position. When spring 14 is compressed to its fullest extent, and when transverse elements 11b and 12a reach a predetermined position, latch 26 is rotated into position to engage trigger device 25. Detent 29 is set to engage pivot pin 28 on trigger device 25 thereby properly mating fulcrum surface 30 on latch 26 with camming surface 31 on trigger device 25. Further, secondary fulcrum surface 32 engages the secondary camming surface 33 on the trigger device to insure quick release of the trap. The trap may now be anchored to a tree, or other similar anchor, with the trigger wires 27 disposed substantially across the opening. The animal engages, typically with a foot, trigger wires 27 thereby actuating trigger device 25 which is rotatable on transverse element 12a. Actuation of trigger wires 27 in either direction will spring the trap and release latch 26 allowing the trap to return to its relaxed position, entrapping the animal. When wire 27 is contacted slightly, it forces trigger device 25 to rotate. Rotation of trigger device 25 causes a camming action on latch surface 30 and a secondary camming action on latch surface 32. This forces latch 26 to rotate on transverse element 11b away from the trigger device 25 quickly and positively releasing the latch 26 from the trigger device 25. Spring 14 then quickly urges the trap to the relaxed position without any interference from latch 26 or trigger device 25.

It will, of course, be understood that various changes may be made in the form, details, arrangement and proportions of the various parts without departing from the scope of my invention.

What I claim is:
1. A trap comprising,
a pair of animal-engaging jaw members swingable between closed position and set position, the jaw members confronting each other in spaced relation in said set position,
spring means urging said jaw members toward closed position,
a latch rotatably mounted on one of the jaw members and extending toward the other of the jaw members, the latch having a detent in one edge and fulcrum surfaces on said edge at opposite sides of the detent,
a trigger device opposite the latch and rotatably mounted at one end thereof on the other of said jaw members and having a stationary pin extending transversely of the latch and fitting into the detent thereof, said pin being spaced from said rotatably mounted end of said trigger device and disposed intermediate the jaw members in set position, said trigger device having a pair of camming surfaces at opposite sides of the pin for confronting and engaging the fulcrum surfaces of the latch, and trigger wires connected to the trigger device for engagement by an animal for arcuately moving the pin with respect to one of the jaw members and thereby similarly arcuately moving the detent of the latch about the other jaw member causing said fulcrum and camming surfaces to bear against each other and cause release between the latch and trigger device for releasing the jaw members.

References Cited

UNITED STATES PATENTS

| | | | |
|---|---|---|---|
| 2,564,811 | 8/1951 | Mau | 43—90 |
| 2,701,428 | 2/1955 | Mau | 43—90 |
| 2,947,107 | 8/1960 | Lehn | 43—92 |
| 3,010,245 | 11/1961 | Conibear | 43—90 |
| 3,146,545 | 9/1964 | Frost | 43—90 |
| 3,335,517 | 8/1967 | Montgomery et al. | 43—92 |

WARNER H. CAMP, *Primary Examiner.*